United States Patent [19]
Kahle

[11] Patent Number: 6,012,847
[45] Date of Patent: Jan. 11, 2000

[54] GUIDE ARRANGEMENT FOR HYDRAULIC CYLINDERS

[75] Inventor: Otto Kahle, Hamburg, Germany

[73] Assignee: Carl Freudenberg, Weinheim, Germany

[21] Appl. No.: 08/809,913

[22] PCT Filed: Sep. 29, 1995

[86] PCT No.: PCT/EP95/03874

§ 371 Date: Jun. 2, 1997

§ 102(e) Date: Jun. 2, 1997

[87] PCT Pub. No.: WO96/10700

PCT Pub. Date: Apr. 11, 1996

[30] Foreign Application Priority Data

Oct. 4, 1994 [DE] Germany ............... 94 15 921 U

[51] Int. Cl.$^7$ .................................................. F16C 29/02
[52] U.S. Cl. ........................................ 384/38; 384/42
[58] Field of Search ............... 384/38, 192, 37, 384/41, 40, 42

[56] References Cited

U.S. PATENT DOCUMENTS

| | | |
|---|---|---|
| 3,995,914 | 12/1976 | Schardt et al. |
| 4,605,363 | 8/1986 | Walsh ........................ 384/192 |
| 4,907,814 | 3/1990 | Foster ........................ 384/202 |
| 4,995,734 | 2/1991 | Schroeder .................... 384/38 |
| 5,052,824 | 10/1991 | Van Wyk ..................... 384/203 |

FOREIGN PATENT DOCUMENTS

| | | | |
|---|---|---|---|
| 1259363 | 3/1961 | France . | |
| 2 673 449 A1 | 3/1991 | France ............. | F16C 23/04 |
| 2673449 | 4/1992 | France ............. | F16C 23/04 |
| 32 16 427 A1 | 11/1983 | Germany ........... | F16C 29/02 |
| 35 17 895 A1 | 11/1986 | Germany ........... | E01D 19/04 |
| 58-084240 | 5/1983 | Japan ............... | F16F 9/36 |

*Primary Examiner*—Lenard A. Footland
*Attorney, Agent, or Firm*—Alix, Yale & Ristas, LLP

[57] ABSTRACT

Guide-ring arrangement on a cylindrical guide part for the relative guiding of an elongate guided part having a guide ring where the rear surface projects in a convex manner.

7 Claims, 1 Drawing Sheet

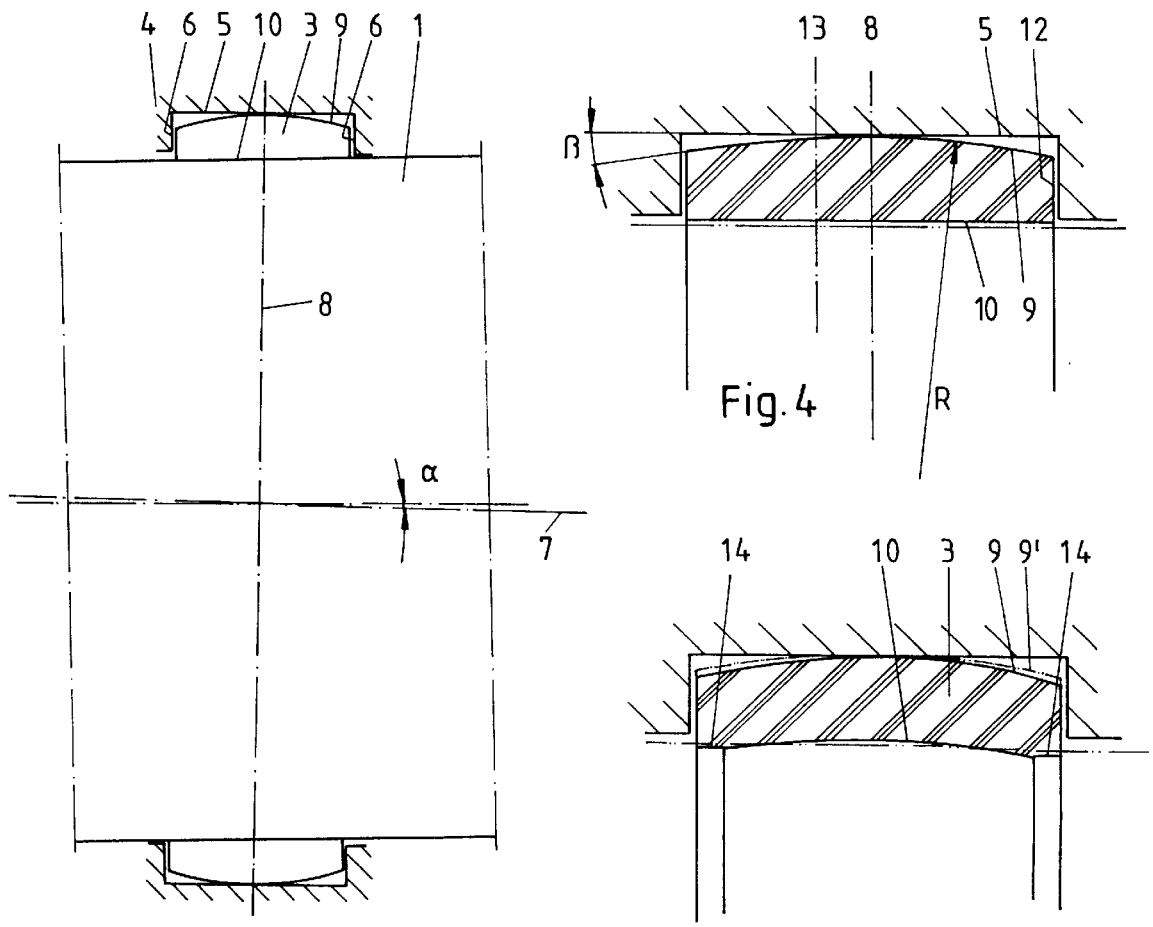

GUIDE ARRANGEMENT FOR HYDRAULIC CYLINDERS

CROSS-REFERENCE TO RELATED APPLICATIONS

This is the national stage of International Application No. PCT/EP95/03874 filed on Sep. 29, 1995.

FIELD OF INVENTION

The present invention relates generally to guides for cylinders and is more particularly concerned with a guide ring assembly having improved operating characteristics.

BACKGROUND OF THE INVENTION

It is known (H. K. Müller: Abdichtung bewegter Maschinenteile [Sealing of moving machine parts], Waiblingen, 1990, p. 190, 191) to provide guide rings in hydraulic cylinders for the flush alignment of the rod. On the one hand, they must be sufficiently dimensioned to absorb the guide forces. On the other hand, they must not damage the very finely processed surface of the rod. Instead of the metal guides previously used, guide rings made of materials with a relatively low modulus of elasticity, for example thermoplastic materials, are therefore preferred, which can yield more easily in the event of an inclined position of the rod relative to the cylinder. However, its strength is no longer adequate to withstand the loading which has increased in the course of time. Thermosetting materials are therefore used to a greater extent, but again experience has proved that damage to the rod surface occurs or the guide rings are destroyed.

The invention is based on an analysis of the damage, which shows that the inclined position of the rod relative to the cylinder leads to far higher loading of the guide ring than was previously assumed. Such an inclined position namely results in pressing of the edges which may lead to a peak load far exceeding ten times the nominal load. The force-absorbing capacity of the guide rings also cannot simply be increased by lengthening them in the axial direction or connecting a plurality of guide rings one behind the other because, in an inclined position of the rod, they are load-bearing in any case only on part of their length. In contrast, the problem of the edge load in the case of longer guide rings compared to shorter ones may be further exacerbated because the inclined position of the rod relative to the cylinder causes an additional radial space requirement of the rod at the guide-ring edges, the amount of which is not only proportional to the sine of the inclined position of the rod, but is also proportional to the axial length of the guide ring. Whenever the guide ring which is built into the cylinder and interacts with the surface of the rod is often mentioned here and in the following text for reasons of simplicity, this should also, mutatis mutandis, mean the guide ring which is provided on the piston and interacts with the cylinder tube.

To relieve a piston or a rod guide from the forces originating from an inclined position of the rod, it is known (Patent Abstracts of Japan Vol. 7 No. 183 (M-235) (1328) Aug. 12, 1983—JP-A-58 084 240) to connect a spherical roller bearing between the rod and the piston or between the cylinder and the rod guide. Instead, as is known in another context (FR-A 2 673 449), there could also be spherical mobility of the guide ring. However, the production of spherical surfaces involves substantial expense. This applies even more so because the mutually supporting spherical surfaces have to be of identically spherical design since the pendulum motion taking place between them generally takes place under high forces and therefore a lack of congruence would lead to a high level of wear.

SUMMARY OF THE INVENTION

The invention is based on the object of providing a guide-ring arrangement which permits high guide forces with little loading of the sliding surface and is not subject to the high production expense of spherical surfaces. The same applies in relation to the guiding of a piston relative to an elongate cylinder tube.

The solution according to the invention consists in providing a guide ring of the type described that is held in a plane running perpendicular to the access of the guide part even when an angle of deviation from the axis occurs so that the guide ring will be twisted.

Starting from the observation that the pressing of the edges of the guide ring increases enormously in the event of an inclined position of the rod and in this case the load-bearing surface of the guide ring is reduced at the same time, the solution according to the invention lies in the concept that the regions of the guide ring loaded in each case by the guide forces of the rod can follow the inclined position of the rod. Since, in this case, the ring remains fixed in its plane and the rod cannot follow in the manner of a ball joint, it becomes twisted in itself. This torsion with simultaneous support by the housing is made possible due to the fact that the rear surface of the guide ring and the associated supporting surface of the housing project in a convex manner in their axially central region in relation to one another while, towards the ends, they enclose a gap which increases in width. In relation to one another, they are ball-shaped, in which case it is possible for the ball shape either to be limited to the rear surface of the guide ring with a cylindrical supporting surface or to the supporting surface with a cylindrical rear surface of the guide ring or to be distributed over both surfaces. The ball shape permits the guide ring to tilt in an inclined position of the rod and thus to adapt to it with corresponding twisting. This should not be confused with the congruently spherical design of the rear surface of the guide ring with the supporting surface in the sense of spherical pivotability of the guide ring. On the contrary, this is obtained axially, for example by fitting it into a receiving groove so that as a whole it cannot follow the rod by a pivoting movement. It maintains its position in a plane perpendicular to the cylinder axis. The inventive adaptation to the inclined position of the rod is therefore only possible due to the fact that it is deformed differently in sections and is thus twisted in relation to a circumferential line.

The solution thus appears to be paradoxical since the contact surface of the guide ring against the supporting surface of the groove receiving it is reduced by this measure. However, the invention has recognized the fact that this nevertheless involves a significant improvement in the loading conditions. Whereas, with a fixed guide ring, the loading is concentrated on the edges; in the case of the invention it occurs primarily in the central region of the guide ring, specifically in a manner similar to Hertzian loading. Whereas the loading concentrated on the edge of the guide ring may lead to the material flowing plastically or breaking out there, it easily withstands even higher loading in regions located further towards the inside because the material undergoing loading is supported on all sides all around.

In principle, any design of the rear surface of the guide ring or of the associated supporting surface in which these surfaces are supported on one another in their axially central region while they gain spacing from one another towards the ends is suitable to implement the invention. However, a curvature of one or both of these surfaces which is curved monotonically in meridional section is preferred. Good results were achieved with a curvature following a circular arc, that is to say the curvature is spherical, the radius of curvature being equal to half the diameter of the rear surface of the guide ring. However, it is usually more expedient for the curvature to have a greater radius. It expediently follows the formula $R=L/(2 \sin\alpha)$, R being the radius of the curvature, L the axial length of the guide ring and $\alpha$ the maximum angle of deviation from the axis. The radius of the curvature is generally at least about twice as large as the radius of the guide ring, the radius of the curvature increasing from the central region of maximum projection in each case towards the ends according to a particular feature of the invention. This feature has the advantageous consequence that the force-transmission conditions become more favourable with increasing deformation of the guide ring due to an inclined position of the rod.

The inventive solution is not only paradoxical due to the force-transmission conditions on the back of the guide ring, which appear to be unfavourable at first sight, but also because, owing to the expected deflection of the guide surface of the guide ring facing the rod, a reduction in the load-bearing part of the said guide surface is to be expected. Although this expectation comes about, it does not have the adverse effects feared. In a similar way to the force transmission from the rear surface of the guide ring to the supporting surface, the deflection of the guide ring in conjunction with its inclined position leads to the fact that the principally loaded zone is shifted from the guide-ring edges to regions of the guide surface located more centrally. On the one hand, the guide-ring material is able to withstand higher loading there. On the other hand, this improves the lubrication conditions. This is because the contact pressure which increases from the edge of the guide surface to the principally loaded zone, like a wedge gap, results in fact in an approximation to hydrodynamic lubrication.

The guide surface of the guide ring may be cylindrical, as is customary in previously known guide rings. According to a particular feature of the invention, however, it is slightly hollowed in a concave manner. In this case, the dimensions of the hollow and of the deformation resistance of the guide ring are matched to one another in such a way that, in that circumferential zone of the guide ring which principally has to absorb the lateral guide force, the deformation of the ring has progressed, at the latest when the maximum expected guide force occurs, to the extent that the surface of the guided part rests against the base of the hollow. As a result, on the one hand a better force distribution over the entire axial length of the guide ring in the loaded section is achieved. On the other hand, this results in a scraping effect at the end edges of the guide ring if these are expediently designed with a smaller diameter of the guide surface than corresponds to the diameter of the guided rod. In the opposite case that a guide ring on a piston interacts with a cylinder bore, the diameter of the guide surface is correspondingly slightly larger at its axial ends than the diameter of the cylinder bore. Particles which may have an abrasive effect are thus prevented with a high probability from entering the guide ring. In contrast, it does not matter if they enter between the rear surface of the guide ring and the supporting surface because they become embedded there without damage during the rolling movement of the ring. A further advantage of this design consists in the fact that the prestress of the guide ring achieved by the specified dimensioning leads, in the case of small guide forces, to a clearance-free basic position and thus to particularly small deflections within the spring path of the two limbs of the guide ring (viewed in meridional section). The hydrodynamic lubricating effect mentioned in more detail above is not eliminated by the hollowed design of the guide surface at high loads at which it is particularly important.

Surprisingly, the hollow of the guide surface of the guide ring in conjunction with the convex design of its rear surface does not necessarily lead to reduced guiding quality under a higher load in the sense of a clearance. According to the invention, in fact the largest diameter of the guide surface in its central region is not designed to be substantially larger than the dimension resulting if the diameter of the rod is increased by the production tolerances and the amount of thermal expansion (the opposite for use of the guide ring on a piston for guiding relative to a cylinder tube). When utilizing all the production tolerances and with maximum thermal expansion of the guide ring, the radial clearance is zero. The conditions are therefore not at all less favourable than in the case of a guide ring with solely cylindrical guide, rear and supporting surfaces. On the contrary, in the previously known cylindrical guide rings, a greater clearance has to be provided so that the inevitable inclined position of the rod can be permitted without the guide ring being destroyed solely because of this inclined position.

It has been described above that the deformation of the guide ring takes place under torsion relative to a circumferential line. In order to facilitate this deformation, provision may be made according to the invention for deformation points of reduced deformation resistance to be provided distributed over the circumference. The capability of these points to undergo easier deformation relates primarily to the torsion since successive ring sections will assume a different inclined position relative to the cylinder axis. However, other deformations may also be involved, for example changes in the spacing in the circumferential direction, primarily at the axial ends of the guide ring.

The reduced deformation resistance is expediently brought about by reducing the cross-sectional area in the meridional section where the connection of integrally designed ring sections is concerned. This reduction expediently takes place towards the axial centre of the guide ring since the deformations are the smallest there. It is not necessary for the deformations to take place elastically. They may also be of a plastic nature. They may even lead to rupture without this impairing the function. The deformation points may thus be designed as intended rupture points. The ring sections which are no longer firmly connected to one another after the rupture are held in the intended position by the component in which they are mounted, for example by the end-face flanks of an assembly groove.

The guide ring does not need to be of integral design; on the contrary, it can be composed of a plurality of non-integral ring sections. For the purpose of easier assembly, however, these ring sections are expediently coupled to one another in such a way that they can be treated as a unit. For example, they may be coupled to one another by a pin and bore to form the finished guide ring.

Also it is not necessary for the guide ring to be closed in the circumference. On the contrary, it may be formed from a band section, as is known per se. Any divisions should be radial and parallel to the axis so that circumferential stresses do not lead to a displacement of band ends adjoining one another obliquely.

All materials which have sufficient sliding, bearing and strength properties can be considered for the design of the guide ring according to the invention. Plastics are preferably used. The choice of thermoplastic or thermosetting materials depends on the respective application. Bearing metals should also not be ruled out.

Since the specific loading of the guide rings according to the invention may lead to high shearing stresses and to substantial tensile stresses in the axial and circumferential direction, it may be expedient to use filler materials, inserts or composite elements which increase the resistance to this loading. For example, the shearing strength of a plastic can be increased by filler materials. The tensile strength can be increased by inserting an axial and/or circumferential reinforcement. Finally, it may be expedient to increase the bending resistance of a torque axis running in the circumferential direction, for example by placing on the back a metal element which is resistant to bending.

BRIEF DESCRIPTION OF THE DRAWING

The invention is explained in greater detail below with reference to the drawing which illustrates advantageous exemplary embodiments.

FIGS. 1 and 2 show a hydraulic cylinder with a rod extended to a different extent;

FIG. 3 shows a diagrammatic partial section through a guide ring with the rod section located therein;

FIG. 4 shows a cross-section of a guide ring on an enlarged scale; and

FIG. 5 shows a modified embodiment of the cross-section of the guide ring.

DESCRIPTION OF A PREFERRED EMBODIMENT

When relatively high transverse forces act on the rods of hydraulic apparatuses, a torque results between the rod 1 and the cylinder 2 which has to be transmitted by the interacting guide surfaces of these elements. This purpose is served by guide rings 3 which are provided on the piston and on the cylinder opening in order to interact in a gentle manner in each case with the sensitive, very finely processed surface of the rod or the cylinder bore. When—as illustrated by dotted/dashed lines in FIG. 2—the rod is in an inclined position relative to the cylinder, the loading in the known guide rings which are rectangular in meridional section is concentrated at their edges, which may lead to damage to the guide rings and ultimately also to the sliding surface interacting therewith.

In comparison, the guide ring according to the invention can yield to the inclined position of the rod, as is demonstrated in FIG. 3.

The guide ring 3 is mounted in the cylinder housing 4 in a groove whose base 5 forms a supporting surface for the guide ring. It is held in the axial direction with little clearance by means of the end faces 6 of the groove, so that it remains aligned with the plane 8 perpendicular to the cylinder axis 7 even in the event of an inclined position of the rod. If the rod 1 is inclined at the angle alpha relative to the cylinder in the plane of the drawing, the annular cross-sections supporting the rod can however follow this inclined position of the ring because the rear surface 9 of the guide ring 3 is not held firmly by the supporting surface 5. Since the ring is held firmly in the plane perpendicular to the axis 7, it undergoes torsion.

In the loaded ring section, the entire guide surface 10 rests against the surface of the rod 1. This does not mean that all the parts of this surface are involved to an equal extent in the transmission of the guide force. On the contrary, the pressing in that region of the guide surface which is located opposite the part 9 resting against the supporting surface 5 will undergo higher loading while the adjacent regions of the guide surface 10 have to absorb a lower load as a result of deflection of the guide ring 3. Nevertheless, better load distribution takes place in the guide surface 10 than in the previously known guide rings. Moreover, this type of loading is more favourable because it is similar to Hertzian loading. Although the radial extent of the ring is too small for the Hertzian equations to be able to be applied unreservedly, the surface regions undergoing loading are supported all around by ring material, so that the permissible load is far higher than in the event of edge loading of the previously known rings.

The loading of the guide ring on the back is to be assessed similarly. Although the curvature of the rear surface leads to a load concentration, the fact that the loading is similar to Hertzian loading has a favourable effect here, too, so that the specific load-bearing capacity of the material is far higher than in the known loading of the previously known rings.

In view of a favourable force transmission from the rear surface of the guide ring to the supporting surface, the largest possible radius of curvature of the rear surface in the meridional plane is desirable. It is at least large enough for the tangent to the rear surface to enclose an angle beta with the direction of the supporting surface 6 in the remotest region of the guide ring (FIG. 4), which angle is not smaller than the angle of inclination alpha of the rod. In this case, however, it should be ensured that, in the event of that inclined position of the rod and the guide ring in which the maximum loading by the guide force takes place, the core of the loading region of the guide ring still has sufficient spacing from its edge. Accordingly, that region of the rear surface 9 in which the tangent angle beta is equal to the maximum angle of inclination alpha of the rod should have sufficient spacing from the end face of the guide ring.

Since the guide force generally increases with an increasing inclination, it may be expedient to allow the radius of curvature of the rear surface to increase gradually from the centre towards the end faces in order thus to provide more favourable Hertzian loading conditions in the region of the higher loading outside the central region.

In the drawings, it has been assumed that the cross-sectional shape of the guide ring is symmetrical in relation to its centre plane 8. This is not essential. In contrast, it may be expedient for the region of the rear surface 9 or of the supporting surface 5 projecting furthest to be arranged off-centre nearer to that end face of the guide ring which faces inwards with regard to the overall arrangement of the hydraulic cylinder. In the case of that guide ring which is provided at the opening of a cylinder, this is the end face of the guide ring facing the piston of the rod. In the case of the guide ring arranged on a piston and interacting with the cylinder bore, this is the end face which is oriented towards the cylinder opening. This is based on the consideration that an inclined position of the guide ring on the loaded side always takes place only in one direction, the principal loading zone of the guide ring migrating outwards with regard to the overall arrangement. Thus if it were to be assumed, for example, that FIG. 4 depicts a guide ring which is built into the cylinder and whose end face 12 appearing on the right in the drawing faces outwards, it is conceivable to allow the ring to end on the inner side at the plane 13 illustrated by dotted/dashed lines, that is to say with a slight spacing from the centre plane 8 towards the inner side.

The magnitude of the radial guide forces to be absorbed by the guide ring depends on the angle of inclination of the rod relative to the cylinder. Since clearance in the guide ring increases the inclination, it must be kept as small as possible. It should not be greater than the sum of the radial manufacturing tolerances of the three elements, housing, rod and guide ring. This clearance is indicated in FIG. 4 between the guide surface 10 and the surface of the rod indicated by dotted/dashed lines.

According to FIG. 5, this clearance can be ruled out—at least for small guide forces—by the guide surface 10 being hollowed out slightly so that, in the edge regions 14, it at least reaches, but preferably goes beyond the surface of the rod, again indicated by dashed lines, even with a summation of the largest manufacturing tolerances. The latter case is illustrated in FIG. 5, where it can be seen that the edge regions 14 of the guide ring 3 extend radially inwards beyond the surface line of the rod, indicated by dashed lines, in the unstressed state. This means that the guide ring must be deformed elastically during assembly. The edge regions 14 then lie on the surface of the rod, while the rear surface 9 is deformed in the direction of the dashed line 9'.

As long as the radial guide force transmitted from the guide ring to the rod is not higher than the elastic prestressing force of the guide ring, the arrangement is completely without clearance. In the case of higher forces, the edge regions 14 of the guide ring will gradually yield radially outwards, in which case, depending on the shaping of the guide surface 10, an increasing proportion thereof may come into contact with the rod surface. In this case, the contact surface migrates increasingly towards the centre of the guide ring, as a result of which its elastic properties become increasingly more rigid until ultimately complete contact of the rod surface against the guide surface 10 takes place even in its region which was originally furthest away from the rod. The position of this region thus determines the maximum clearance. The condition that the clearance should not be substantially greater than the sum of the manufacturing tolerances and amounts of thermal expansion involved is therefore applied in this embodiment to the region of the guide surface which originally has the greatest radial spacing from the rod surface.

Although, in the description of the example, reference has principally been made to that guide ring which is built into the cylinder and interacts in a sliding manner with the rod surface, it is obvious that these explanations apply correspondingly likewise to that guide ring which is installed on the piston or at the end of the plunger. Its cylindrical guide surface interacts with the surface of the bore of the cylinder, while the convexly curved rear surface is supported on the base of the groove which receives the ring.

What is claimed is:

1. A guide ring arrangement for a cylindrical guide part having a central axis for the relative guiding of an elongate guided part having a cylindrical surface comprising a guide ring and a holding device for holding the guide ring, said guide ring having end walls, an essentially cylindrical guide or sliding surface for sliding interaction with the cylindrical surface of the guided part and a rear mounted surface spaced from the guide surface by the thickness of the ring, said holding device having an essentially cylindrical supporting surface interacting with the rear surface of the guide ring, said interacting rear surface having a convex projection with an apex within a plane perpendicular to said axis of said guide part, said convex projection being designed as a curvature which is curved monotonically in the longitudinal section and corresponds approximately to the formula: $R=L/(2 \sin\alpha)$ wherein L is the axial length of the guide-ring and $\alpha$ is the maximum angle of deviation from the axis, said supporting surface and said rear surface defining a gap therebetween having a width which increases as the distance from the apex increases, the holding device having end wall surfaces at opposite ends of said supporting surface for engagement by the end walls of the guide ring to restrainably hold the guide ring apex in said plane running perpendicular to the axis of the guide part even when an angle ($\alpha$) of deviation from the axis occurs between the guide part and the guided part whereby the guide ring is deformed in the presence of such an angle ($\alpha$) of deviation from the axis.

2. Guide-ring arrangement according to claim 1, characterized in that the guide surface (10) is hollowed in a concave manner.

3. Guide-ring arrangement according to claim 2, characterized in that the dimensions of the hollow and of the deformation resistance of the guide ring (3) are calculated such that the base of the hollow rests against the surface of the guided part at the latest at the maximum expected guide force.

4. Guide-ring arrangement according to claim 3, characterized in that the smallest diameter of the guide surface (10) is smaller at its axial ends than the diameter of the guided part designed as a rod.

5. Guide-ring arrangement according to claim 4, characterized in that the largest diameter of the guide surface (10) is not larger in said plane than the diameter of the guided part designed as a rod plus production tolerances and an amount of thermal expansion.

6. A guide ring arrangement for a cylindrical guide part having a central axis for the relative guiding of an elongate guided part having a cylindrical surface comprising a guide ring and a holding device for holding the guide ring, said guide ring having end walls, an essentially cylindrical guide or sliding surface for sliding interaction with the cylindrical surface of the guided part and a rear mounted surface spaced from the guide surface by the thickness of the ring, said holding device having an essentially cylindrical supporting surface interacting with the rear surface of the guide ring, said interacting rear surface having a convex projection with an apex within a plane perpendicular to said axis of said guide part, said convex projection being designed as a curvature which is curved monotonically in the longitudinal section and is at least approximately equal to twice the radius of the guide ring, said supporting surface and said rear surface defining a gap therebetween having a width which increases as the distance from the apex increases, the holding device having end wall surfaces at opposite ends of said supporting surface for engagement by the end walls of the guide ring to restrainably hold the guide ring apex in said plane running perpendicular to the axis of the guide part even when an angle ($\alpha$) of deviation from the axis occurs between the guide part and the guided part whereby the guide ring is deformed in the presence of such an angle ($\alpha$) of deviation from the axis.

7. A guide ring arrangement for a cylindrical guide part having a central axis for the relative guiding of an elongate guided part having a cylindrical surface comprising a guide ring and a holding device for holding the guide ring, said guide ring having end walls, an essentially cylindrical guide or sliding surface for sliding interaction with the cylindrical surface of the guided part and a rear mounted surface spaced from the guide surface by the thickness of the ring, said holding device having an essentially cylindrical supporting surface interacting with the rear surface of the guide ring, said interacting rear surface having a convex projection with an apex within a plane perpendicular to said axis of said guide part, said convex projection being designed as a curvature which is curved monotonically in the longitudinal section and increases from the region of maximum projection towards the ends, said supporting surface and said rear surface defining a gap therebetween having a width which increases as the distance from the apex increases, the holding device having end wall surfaces at opposite ends of said supporting surface for engagement by the end walls of the guide ring to restrainably hold the guide ring apex in said plane running perpendicular to the axis of the guide part even when an angle ($\alpha$) of deviation from the axis occurs between the guide part and the guided part whereby the guide ring is deformed in the presence of such an angle ($\alpha$) of deviation from the axis.

* * * * *